US012571296B2

(12) United States Patent
Johnson et al.

(10) Patent No.: US 12,571,296 B2
(45) Date of Patent: Mar. 10, 2026

(54) FREQUENCY ANALYSIS OF TIME-SERIES VIBRATIONAL DATA

(71) Applicant: Schlumberger Technology Corporation, Sugar Land, TX (US)

(72) Inventors: Ashley Bernard Johnson, Cambridge (GB); Ali Ozbek, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/136,871

(22) PCT Filed: Feb. 13, 2024

(86) PCT No.: PCT/US2024/015455
§ 371 (c)(1),
(2) Date: Jun. 7, 2025

(87) PCT Pub. No.: WO2024/173285
PCT Pub. Date: Aug. 22, 2024

(65) Prior Publication Data
US 2026/0009320 A1 Jan. 8, 2026

Related U.S. Application Data

(60) Provisional application No. 63/484,550, filed on Feb. 13, 2023.

(51) Int. Cl.
*E21B 47/00* (2012.01)
*G01H 1/06* (2006.01)
(52) U.S. Cl.
CPC .............. *E21B 47/00* (2013.01); *G01H 1/06* (2013.01)

(58) Field of Classification Search
CPC ...................................................... E21B 47/008
See application file for complete search history.

(56) References Cited

U.S. PATENT DOCUMENTS

| | | | |
|---|---|---|---|
| 6,094,989 | A | 8/2000 | Twerdochlib |
| 2012/0130693 | A1 | 5/2012 | Ertas |

(Continued)

OTHER PUBLICATIONS

International Search Report and Written Opinion of International Patent Application No. PCT/US2024/015455 dated on Jun. 10, 2024, 12 pages.

*Primary Examiner* — William D Hutton, Jr.
*Assistant Examiner* — Avi T Skaist
(74) *Attorney, Agent, or Firm* — Jeffrey D. Frantz

(57) ABSTRACT

Method and systems are described that obtain or collect time-series vibration data related to operation of a downhole drilling system and convert the time-series vibration data to frequency domain vibration data. The frequency domain vibration data can be evaluated to determine one or more vibrational resonance frequencies as well as corresponding non-aliased harmonic frequencies (if and when present) and aliased harmonic frequencies (if and when present) in the frequency domain vibration data. Change in the one or more vibrational resonance frequencies in the frequency domain vibration data over time can be monitored during the drilling operations to detect or predict the occurrence of a defect or failure or other unwanted conditions (e.g. HFTO) in the drilling system. A health alert can be generated in response to the detection or prediction of the occurrence of a defect or failure or other unwanted condition in the drilling system.

18 Claims, 8 Drawing Sheets

(56)                    References Cited

U.S. PATENT DOCUMENTS

2017/0167245 A1      6/2017  Dickenson
2019/0203588 A1*     7/2019  Popp ........................ E21B 44/00
2020/0284099 A1      9/2020  Hassani
2020/0284138 A1*     9/2020  Bowler ................. E21B 47/008
2020/0408079 A1     12/2020  Ebrahimi

* cited by examiner

FREQUENCY ANALYSIS OF TIME-SERIES VIBRATIONAL DATA

CROSS-REFERENCE TO RELATED APPLICATION(S)

The present disclosure is a National Stage Entry of International Application No. PCT/US2024/015455, filed Feb. 13, 2024, which claims priority from U.S. Provisional Application No. 63/484,550, filed on Feb. 13, 2023, herein incorporated by reference in its entirety.

FIELD

The present disclosure relates to methods and systems for assessing the health of downhole systems.

BACKGROUND

In downhole systems, a drill string can be used to convey a bottomhole assembly (BHA) into a wellbore for use in analyzing, drilling, producing, remediating, or abandoning a well. During drilling, for instance, the drill string may be used to convey a drilling BHA into the wellbore. The drilling BHA includes a drill bit that is rotated to drill the formation, while drilling fluid in the wellbore is used to evacuate the cuttings to surface. The drill bit may be rotated by rotating the drill string from the surface (e.g., with a rotary table or top drive), or may be rotated using downhole equipment such as a downhole motor (e.g., positive displacement motor (PDM) or turbodrill). Of course, other components can be included in the BHA, including underreamers for expanding the wellbore, steering systems for drilling a directional well, measurement or logging-while-drilling components, and the like.

As can be appreciated, the cutting action of the drill bit against the earthen formation and the rotation of the drill string within the wellbore can produce vibrations and motion that can impact operational efficiencies. For example, severe vibrations in the drill string and the BHA during drilling operations can be caused by cutting forces at the drill bit or mass imbalances in downhole tools such as drilling motors. Such vibrations can result in reduced rate of penetration, reduced quality of measurements made by tools of the BHA, and can result in wear, fatigue, and/or failure of downhole components.

As appreciated by those of skill in the art, different vibrations exist, such as lateral vibrations, axial vibrations, and torsional vibrations. For example, high-frequency torsional oscillations ("HFTO") are torsional vibrations that can be experienced during drilling operations and impact operational efficiencies. As used herein, the terms "vibration" and "oscillation" are used with the same broad meaning of repeated and/or periodic movements or periodic deviations of a mean value, such as a mean position, a mean velocity, a mean acceleration, a mean force, and/or a mean torque. In particular, these terms are not meant to be limited to harmonic deviations, but may include all kinds of deviations, such as, but not limited to periodic, harmonic, and statistical deviations. Torsional vibrations can be excited by self-excitation mechanisms that occur due to the interaction of the drill bit or any other cutting structure such as a reamer bit and the formation. HFTO has been discussed by many authors, e.g., see Johnson, A., Bhoite, S., Long, D. and Reagan, C., "Characterizing Drilling Dysfunction: Taking the T Out of HFTO", Society of Petroleum Engineers (SPE), IADC/SPE International Drilling Conference and Exhibition, Mar. 8-10, 2022, Paper Number: SPE-208720-MS. The fundamental frequency of HFTO is in the range 50-400 Hz, while harmonics up to about 1500 Hz are often seen. HFTO can be a leading cause of failure of the downhole system, such as cracked drill collars and broken measurement and electronic components. When these failures occur, operators must make additional unplanned trips to drill the section, resulting in additional drilling time and costs.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments of the present disclosure relate to methods and systems for assessing the health of a downhole system, such as a BHA or drilling system or other downhole tool. An example method includes obtaining or collecting time-series vibration data related to operation of a downhole drilling system. In embodiments, the time-series vibration data can be measured using downhole sensors, such as motion or strain sensors, during drilling operations. Such sensors may include accelerometers, gyroscopes, magnetometers, strain gauges, and the like, and may be positioned on or within a steering system (e.g., rotary steerable collar), MWD, drill bit, reamer, collar, or other component of a BHA or drilling system. The time-series vibration data is converted to frequency domain vibration data. This may be achieved, for instance, by using a Fast-Fourier transform (FFT). The frequency domain vibration data can be evaluated to determine one or more vibrational resonance frequencies as well as corresponding non-aliased harmonic frequencies (if and when present) and aliased harmonic frequencies (if and when present) in the frequency domain vibration data. Change in the one or more vibrational resonance frequencies in the frequency domain vibration data over time can be monitored during the drilling operations to detect or predict the occurrence of a defect or failure or other unwanted conditions (e.g., HFTO) in the drilling system. A health alert can be generated in response to the detection or prediction of the occurrence of a defect or failure or other unwanted condition in the drilling system. The health alert may include a message or display screen that communicates the likelihood that a defect or failure or unwanted condition has been detected. Optionally, the health alert may also include a recommendation or instruction based on the severity of the defect or failure as to what action to take to remedy the detected issue.

The objective of the method is to extend the range and resolution of the frequency analysis of a vibration measurement from the recorded time-series vibrational data. Aliasing can corrupt recorded data by making higher frequency events appear to have a much lower frequency. Traditionally this is either ignored or mitigated by the use of low pass filters set to eliminate the high frequency dysfunction.

With aliasing, an event with frequency, $f_e$, sampled at frequency $f_s$ will appear in the frequency domain at a frequency of $|f_s-f_e|$. In the first instance, it will be reflected at the Nyquist frequency, $f_s/2$. But, even if the event frequency is higher than the sampling frequency, it could still be detected and appear in the frequency data.

In embodiments, the present disclosure can provide methods that detect and track aliased harmonic frequencies and non-aliased harmonic frequencies in frequency domain vibration data to provide a higher resolution of one or more vibrational resonance frequencies related to a dysfunction. For dysfunctions during drilling operations, including HFTO, which have a unique frequency band and multiple harmonics, the methods of the present disclosure can resolve the actual vibrational resonance frequency(ies) related to the dysfunction.

In embodiments, the resolution of the vibrational resonance frequency(ies) can be based on the sampling frequency of the underlying vibrational data and the number of data points being analyzed. For higher harmonics, the resolution will be the same but the frequency of the harmonic(s) will be an integer multiple of the fundamental frequency. Thus, by using the harmonic and dividing by the integer, the resolution of the fundamental frequency can be improved. Unfortunately, harmonic frequencies can exist above the Nyquist frequency and this will be aliased or folded into the spectrum below the Nyquist frequency. However, by careful analysis and knowledge of the fundamental and Nyquist frequencies, the method can be configured to identify the aliased harmonic frequencies in the vibrational data.

In a sampled signal it can be difficult to identify what is and is not aliased. However, the method can employ different sampling frequencies. At these different sampling frequencies, the non-aliased harmonic frequencies will not change while the aliased harmonic frequencies will change, generally by the difference in the sampling frequency. So, by sampling the same signal at two or more different frequencies, the method can identify and distinguish between vibrational resonance frequency(ies), non-aliased harmonic frequencies, and aliased harmonic frequency(ies), which allows for inversion of the aliasing with much less uncertainty.

With drilling dysfunctions there is, almost always, coupling between different parameters (such as axis of acceleration, pressure, or collar speed, so the same frequencies will appear in many measurements. However, if the different coupled parameters are sampled at different sampling frequencies, then the harmonic frequencies will appear at different frequencies and interpretation of the frequency domain vibration data will be significantly easier. Thus, the frequency domain vibration data can be derived from sampling different data streams (coupled parameters) at different sampling frequencies. In this case, the method can make a definitive inversion of the aliased harmonic frequency(ies) and characterize the actual harmonic frequencies, even if these harmonic frequencies are above the sampling frequency.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings as summarized below.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Some embodiments of the present disclosure relate to monitoring changes in the frequency response of one or more components of a downhole system. For instance, example embodiments include monitoring for changes in the vibrational resonance frequency as well as changes in corresponding non-aliased and aliased harmonic frequencies of one or more components of a downhole system. The changes in frequencies can be used for prognostic health monitoring of the integrity of drill string tubulars or other components, or the BHA, including downhole tools.

Figure 1:
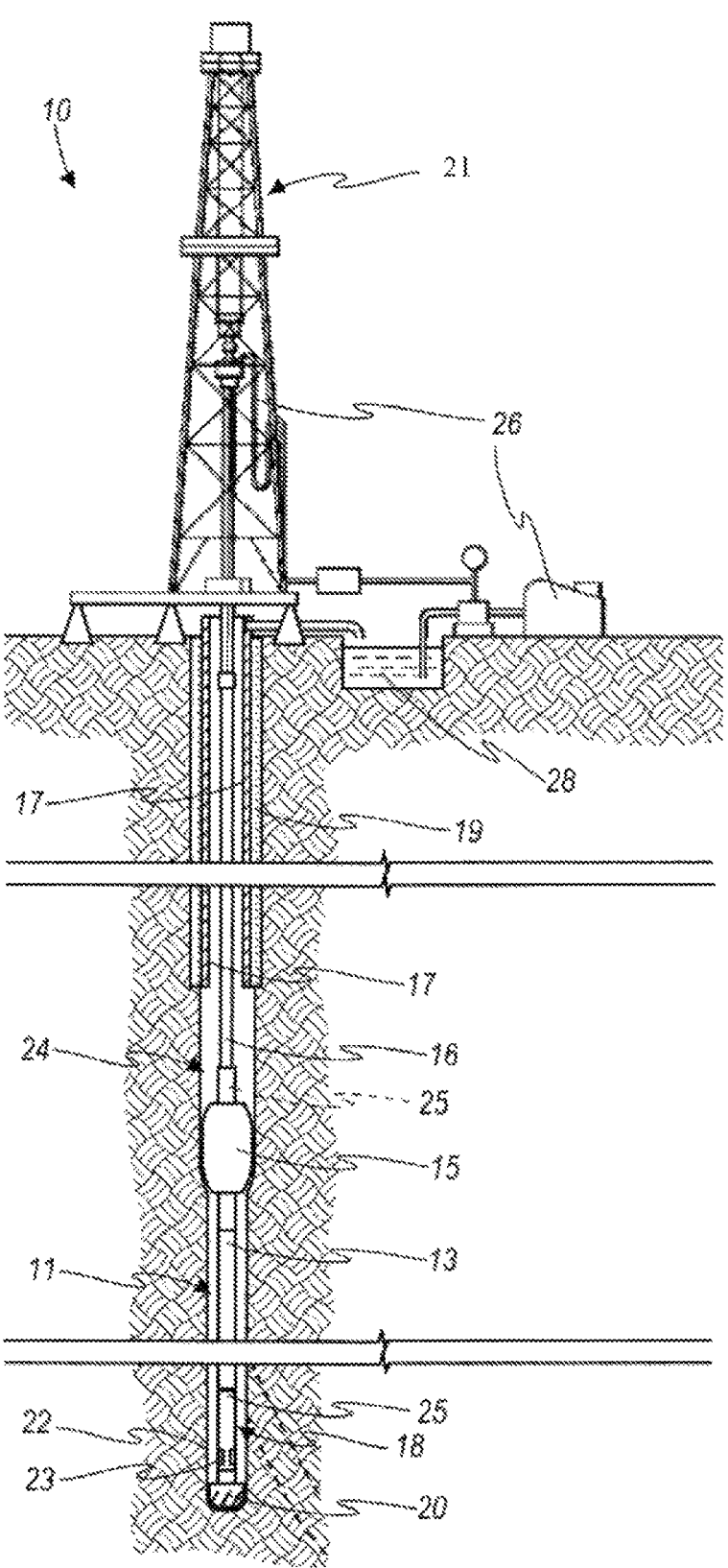
FIG. 1 is a schematic view of a drilling system according to an embodiment of the present disclosure.

FIG. 1 illustrates drilling a wellbore, which employs, by way of example, a drilling system 10 that includes a directional BHA 11. The directional BHA 11 includes both a drill bit 20 and a steering system 18. The BHA 11 can optionally include other components, such as an expandable underreamer 15 and a telemetry system 13, which may include measurement while drilling (MWD) or logging while drilling (LWD) tools. A drill string 16 extends from a drilling rig 21 into a wellbore 22. The drill string 16 may be composed of multiple segments of drill pipe that are connected end-to-end by threaded joints, although coiled tubing may be used in some implementations. An upper part of the wellbore 22 is lined with casing 17 and cemented as indicated at 19. The drill string 16 is connected to the BHA 11, which can include drill collars, drill string tubulars, downhole tools, or other components to connect the drill string 16 to the drill bit 20. The optional underreamer 15 has been expanded in FIG. 1 below the cased section of the wellbore 22. As the drill string 16 is rotated, the drill bit 20 extends the wellbore 22 downwards while the underreamer 15 opens the pilot hole of the wellbore 22 to a larger diameter 24.

The steering system 18 may be used to steer the BHA 11 in a desired path. The path may be a straight hole as shown in FIG. 1, or a directional wellbore (not shown). The steering system 18 may include a rotary steerable system that operates using a so-called push-the-bit or a point-the-bit system. Push-the-bit systems include expandable pads (e.g., pads 23) that push against the wall of the wellbore 22 and push the bit in the opposite direction to steer the drill bit 20. Point-the-bit systems often have an internal drill shaft that bends to point the drill bit 20 in the steering direction. Point-the-bit systems may include rotating or non-rotating housings. Other directional systems can include slide drilling systems that have a non-rotatable housing with a fixed, bent housing. In some cases, the housing of the rotary steerable or other steerable system may be called a collar.

The drilling rig 21 is provided with a system 26 for pumping drilling fluid from a supply 28 down the drill string 16 to the reamer 15 and the drill bit 20. Some of this drilling fluid flows through passages in the drill string 16, reamer 15, steering system 18 and flows back up the annulus around the drill string 16 to the surface.

The concepts of the present disclosure may be integrated in, or associated with, any of the various components of a drilling system, including downhole components such as those illustrated in FIG. 1. FIG. 1 is, however, merely illustrative and other components in a downhole system may make use of the embodiments of this disclosure. For instance, valves, stabilizers, section mills, jars, vibration tools, motors, or other components can benefit from features, techniques, and embodiments described herein. In other embodiments, features of the present disclosure may be used for monitoring condition or health of other components that are not downhole (e.g., rig equipment, generators, etc.), or non-oilfield equipment.

Regardless of the particular surface system used, the drill string 16 can rotate to transmit torque and weight-on-bit to the drill bit 20 to cut the formation. In some cases, the BHA or the steering system 18 can include a downhole motor 25 (e.g., above the pads 23), and the downhole motor 25 may rotate the drill bit 20 at a rate exceeding the rotational speed (if any) of the drill string 16. The downhole motor 25 may rotate the drill bit 20 alone or may rotate additional components. For instance, the dashed lines illustrate an example in which the downhole motor 25 is positioned at or near the top of the BHA and is potentially used to rotate a full length of the BHA. The downhole motor 25 may include a mud motor or positive displacement motor, a turbodrill motor, or any other suitable downhole motor.

During drilling operations, different vibration/oscillation modes may be generated. For instance, one mode of vibration may be generated above the downhole motor 25, and another mode of vibration may be generated below the downhole motor 25. In this case, the operation of the downhole motor 25 effectively uncouples the two modes of vibration (i.e., the drill string vibration mode from the BHA vibration mode). This may occur where, for instance, the length of the drill string 16 above the downhole motor 25 may be longer (e.g., 1-4 km) than the length of the drill string 16 below the downhole motor 25 (e.g., 5-100 m). As a result, the characteristic frequency of the drill string vibration mode may be significantly less than the characteristic frequency of the BHA vibrational mode. For example, in some cases, the characteristic frequency of the drill string vibration mode can be fifty to five hundred times lower than the characteristic frequency of the BHA vibrational mode. These BHA vibrational modes may be referred to as high frequency torsional oscillations (HFTO). During different types of drilling operations, the HFTO may become particularly significant or evident. For instance, depending on the BHA design, the vibrations may be excited more while drilling hard rock than when drilling a softer rock.

HFTO can increase risks of fatigue failure of the drilling system due to the high number of cycles.

Figure 2:
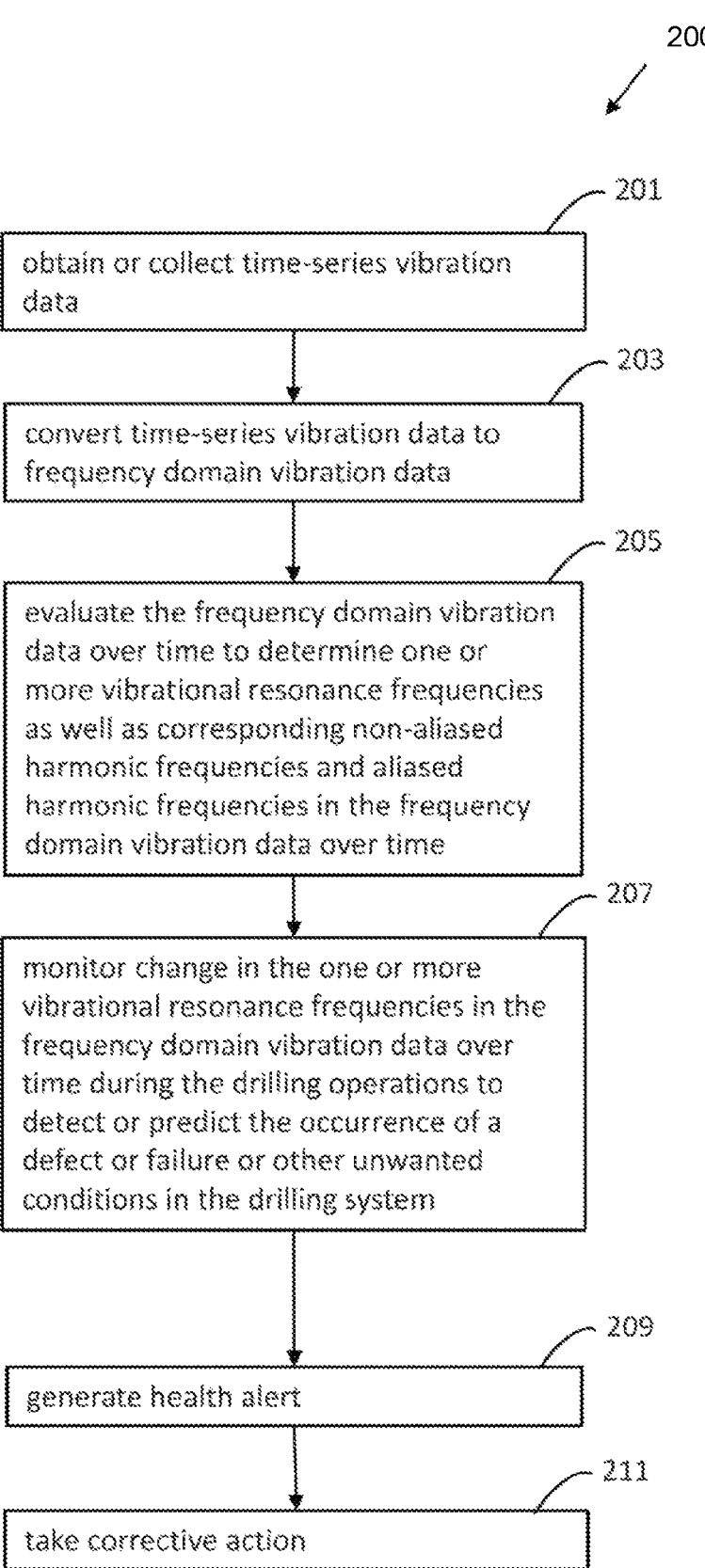
FIG. 2 is a flowchart of a method according to an embodiment of the present disclosure.

Turning now to FIG. 2, an example method is described for use with a drilling system such as that described in FIG. 1. In particular, the method 200 of FIG. 2 may be used to detect defects (e.g., cracks) or failure of the drilling system as they occur in real-time using downhole tool sensors, processors, and hardware/firmware/software. Using such equipment, real-time messages may also be conveyed to a driller to alert the driller to the possible existence of the defect or failure so that a change in drilling parameters, or even pulling-out-of-hole may be performed in response. While described in reference to drilling operations, the method 200 may also be used in connection with other downhole operations, such as wireline, production, tractor conveyance, or other operations.

As shown in FIG. 2, the method 200 may include obtaining or collecting time-series vibration data related to operation of a downhole system at 201. In embodiments, the time-series vibration data can be measured using downhole sensors, such as motion or strain sensors, during drilling operations. Such sensors may include accelerometers, gyroscopes, magnetometers, strain gauges, and the like, and may be positioned on or within a steering system (e.g., rotary steerable collar), MWD, drill bit, reamer, collar, or other component of a BHA or drilling system. The time-series vibration data may be measured directly or may be indirectly determined using other direct measurements. The time-series vibration data can be calibrated in real-time, including using a downhole processor included in a downhole device. The downhole processor may be included in the sensor package or may be part of another tool or component. For instance, a sensor may provide data to a specialized processor to calibrate the vibration data while drilling operations occur. In other embodiments, parameters for calibrating the time-series vibration data can be determined off-line, for example, at the surface prior to or after the drilling operations.

At 203, a processor may be configured to convert the time-series vibration data of 201 to frequency domain vibration data. This may be done, for instance, by using a Fast-Fourier transform (FFT) to convert the time domain frequency data to a frequency domain spectrogram.

At 205, the frequency domain vibration data can be evaluated to determine one or more vibrational resonance frequencies as well as corresponding non-aliased harmonic frequencies (if and when present) and aliased harmonic frequencies (if and when present) in the frequency domain vibration data. When the vibration data is sampled and converted into the digital domain, device nonlinearities can produce harmonics in the vibration data. If a harmonic frequency is greater than the Nyquist frequency of the data sampling, the harmonic appears as an alias. In the frequency domain, the harmonic(s) that are below the Nyquist frequency are referred to as non-aliased harmonics, and the harmonic(s) that are above the Nyquist frequency are folded and referred to as aliased harmonics. Evaluation of the frequency domain vibration data (e.g., frequency domain spectrogram) can be used to identify and differentiate between vibrational resonance frequencies as well as corresponding non-aliased harmonic frequencies and aliased harmonic frequencies in the frequency domain vibration data as well as the order of such harmonic frequencies in the frequency domain vibration data. Such evaluation can employ manual data interpretation or a software-based algorithm to identify peaks in the frequency domain vibration data and classify the peaks as corresponding to either a vibrational resonance frequency, a non-aliased harmonic frequency or aliased harmonic frequencies as well as determine the order of such harmonic frequencies.

At 207, change in the one or more vibrational resonance frequencies in the frequency domain vibration data over time can be monitored during the drilling operations to detect or predict the occurrence of a defect or failure or other unwanted conditions (e.g., HFTO) in the drilling system. For example, where a change in one or more vibrational resonance frequencies in the frequency domain vibration data over time exceeds certain threshold parameters during the drilling operations, the operations can raise a flag that indicates the detection or prediction of the occurrence of a defect or failure or other unwanted condition (e.g., HFTO) in the drilling system. The threshold parameters can be determined from analysis and testing of the failure conditions of the drilling system or similar drilling system.

At 209, a health alert can be generated in response to the detection or prediction of the occurrence of a defect or failure or other unwanted condition in the drilling system at 207. The health alert may include a message generated and sent by a downhole processor, on a tool-to-tool communication bus, warning the likelihood of a defect or failure or unwanted condition has been detected. The generation of the health alert at 209 can also include using a telemetry or communication tool in the BHA that receives the warning message and building a real-time telemetry frame that is sent to the surface. At the surface, the telemetry is de-modulated and the warning message is presented to the driller/operator on a rig-floor display, and in real-time or near real-time. The warning that is presented may be a generic warning or may include severity information. For instance, if a large deviation is detected at 207, the health alert generated at 209 may include an indication that a defect or failure or unwanted condition has likely occurred, an indication of the relative magnitude of the deviation (and potentially the time over which the change occurred), and the driller (e.g., autodriller or human) can take corrective action at 211. Examples of corrective action can include reducing drilling parameters to prevent further propagation of the suspected crack or stopping the operation and pulling out of hole. Optionally, the health alert generated at 209 may also include a recommendation or instruction based on the severity of the defect or failure as to what action to take at 211.

The health alert of 209 can be communicated or displayed to the driller operator. The health alert may include information about the type or severity of the alert, and the driller can take mitigating action. This action may include a decision to re-run the tool with different operations parameters, a decision to send it back to a base for repair, or a decision to run a different tool.

In one embodiment, the operations of 203 to 211 of FIG. 2 may be performed in real-time, during the drilling operations. In other embodiments, the operations of 203 to 211 of FIG. 2 can be performed post-run, after the drilling operation has completed.

Optionally, the evaluation of the frequency domain vibration data can be based on aggregation of the drilling history data. In some instances, a drilling system can be run multiple times in multiple different operations, sites, wells, or the like. For some or all of these runs, sensor/vibration data may be measured, recorded, and stored. Following a run, the data for a particular run may be combined with the data from other runs. This may be completed to determine the calibration of the time-series vibration data and/or the threshold parameters related to change in the one or more vibrational resonance frequencies in the frequency domain vibration data, where such change indicates the detection or prediction of the occurrence of a defect or failure or unwanted condition in the drilling system.

As described above, HFTO is a torsional oscillation of the lower BHA of a drilling system. The details of HFTO are still unclear. One issue is a lack of reliable measurements at scale. The fundamental frequency of HFTO is in the range 50-400 Hz, while harmonics up to about 2,000 Hz are often seen.

Drilling systems that employ vibrational sensors are commercially available from many vendors, but the details of the sampling rate and aliasing characteristics of the vibrational sensors vary and change in the way the vibrational data is recorded. For example, some tools can be configured to collect triaxial accelerometer data (in the X, Y, and Azimuthal axes) at a sampling rate of 1024 Hz. However, it may use an anti-aliasing filter at about 320 Hz, so all dynamics above this frequency will be attenuated in the vibration data, so many vibrational dysfunctions will be lost completely. Other tools can also be configured to collect vibrational data at 1024 Hz. However, these tool do not use anti-aliasing filters so any dynamic above 512 Hz will be aliased and appear in the data at a different frequency. Examples of this are discussed below, but it makes identification of the fundamental vibrational frequencies significantly more difficult.

Two of the challenges with logging and analyzing vibration data of a drilling system is the electronic memory for storing the time-series vibration data and the processing power to transform the vibration data into the frequency domain. For implementations where the transformation of the vibration data into the frequency domain is performed downhole, this is a very significant challenge. The resolution of the Fast-Fourier Transform (FFT) that transforms the vibration data into the frequency domain will be $f_s/N$, where N is the number of data points (samples) in the vibration data and $f_s$ is the frequency of the sampling that collects the data points. Thus, a set of vibration data with 1024 data points obtained from a sampling frequency of 1024 Hz will have a resolution of 1 Hz and a range of 0 to 512 Hz. In this example, 512 Hz is the Nyquist frequency.

Figure 3:
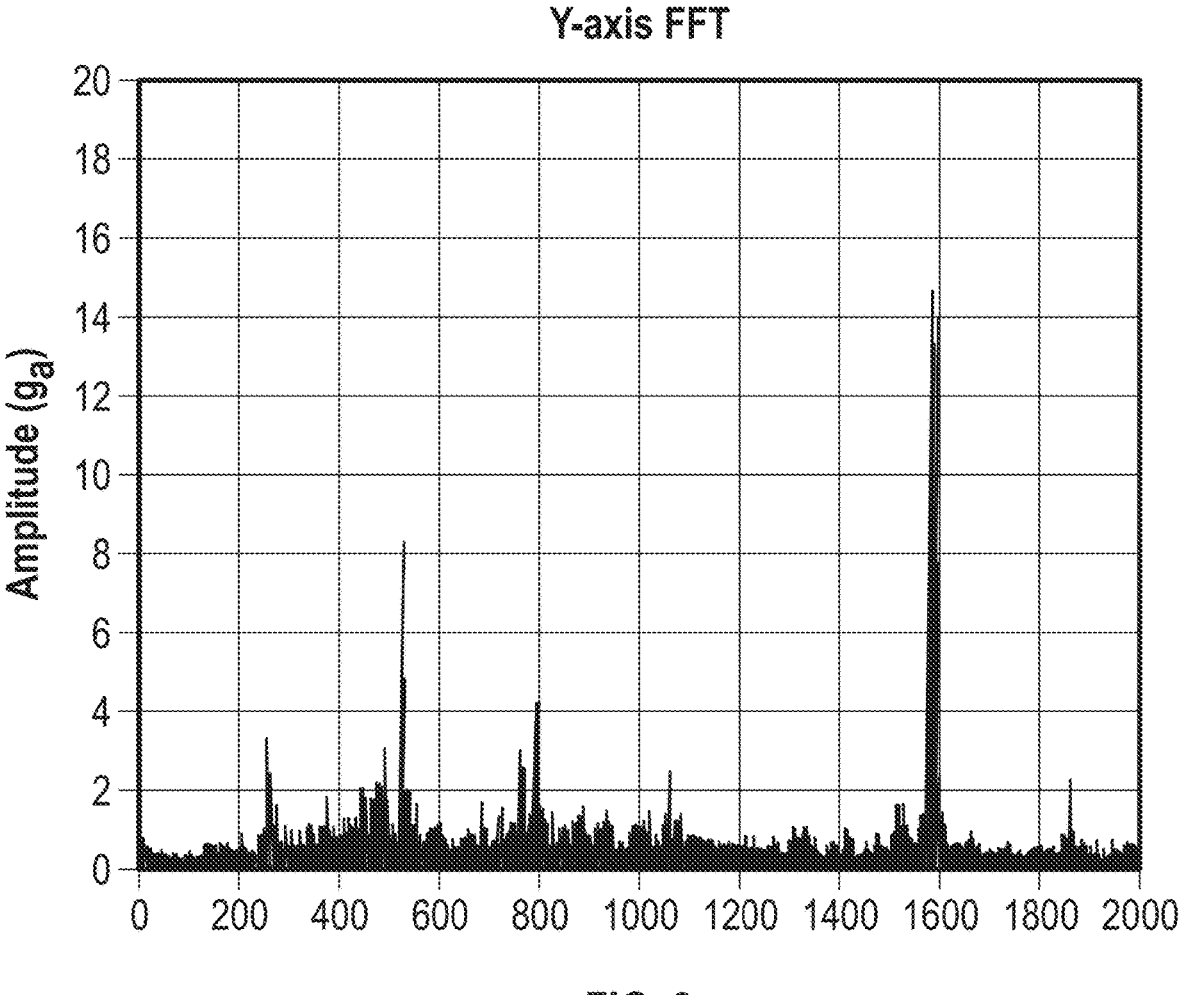
FIG. 3 is a plot of frequency domain vibration data derived from the Y-axis channel of a triaxial accelerometer that is part of an MWD tool.

In one example, a tool can be configured to sample each channel of a triaxial accelerometer (in the X, Y, and Azimuthal axes) at a sampling frequency of 30 kHz and record raw burst data in 9000 data points. The resolution of the FFT that transforms the vibration data into the frequency domain will be just over 3 Hz with a range up to 15 kHz. In this example, 15 KHz is the Nyquist frequency. The frequency domain vibration data determined from a typical set of waveforms from the Y-axis lateral acceleration is shown in FIG. 3. For this case, the fundamental frequency is ~266 Hz, but there are various harmonics. Note that the sixth harmonic is the largest with a frequency of ~1596 Hz. In this example, the objective is to detect small changes in the fundamental frequency of the frequency domain vibration data in order to detect meaningful changes in the tool characteristics. Furthermore, this process is to be performed in a downhole tool that has limited memory and limited processing capacity (e.g., limited computational resources).

Figure 4:
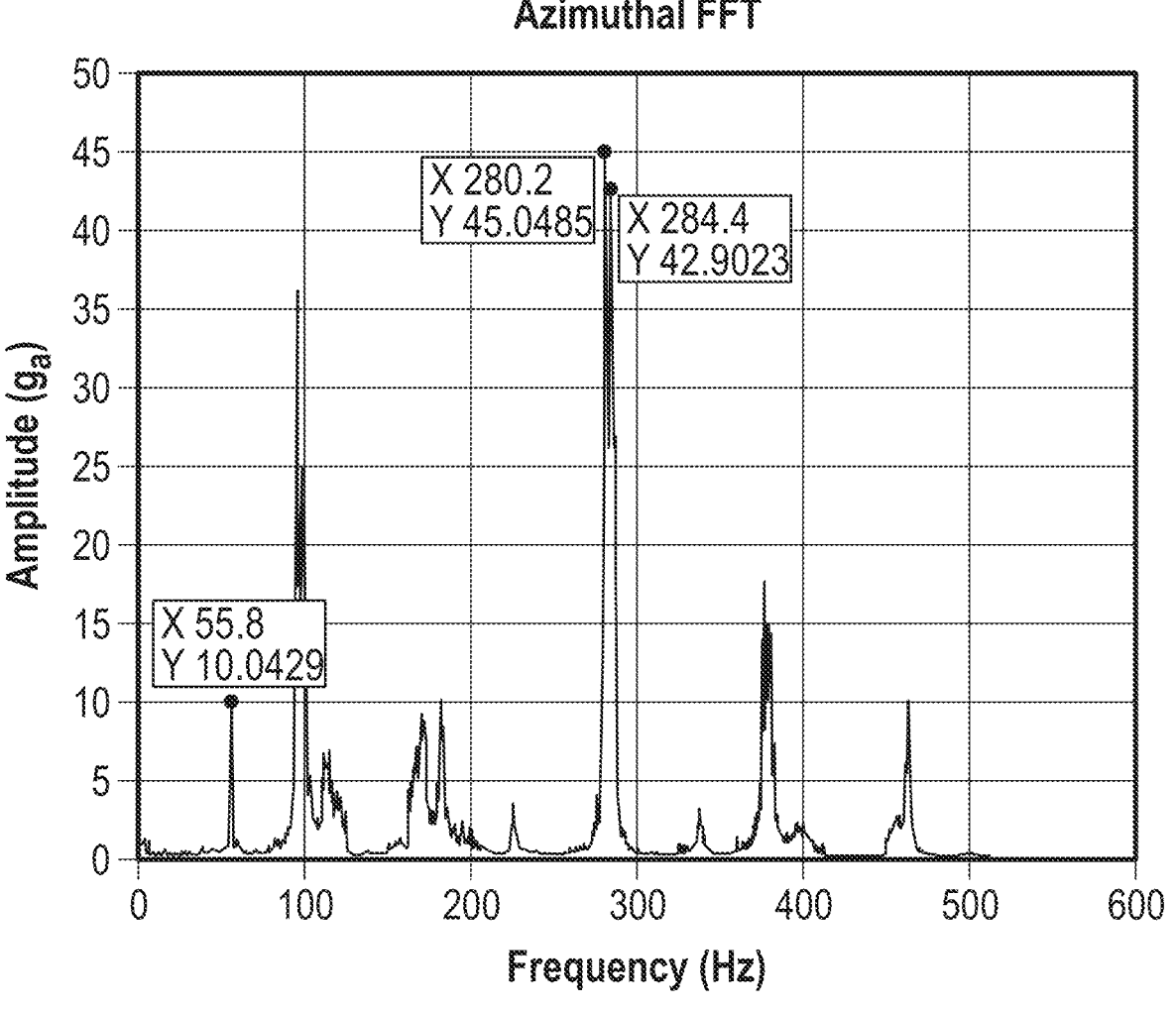
FIG. 4 is a plot of frequency domain vibration data derived from the azimuthal acceleration waveform data.

FIG. 4 shows the frequency domain vibration data derived from the azimuthal acceleration waveform data recorded with a different tool. The sampling of the data is performed at a sampling frequency of 1024 Hz with a Fast Fourier Transform with 5120 points. This provides a Nyquist frequency of 512 Hz. Through careful analysis, the fundamental frequencies of the HFTO have been characterized at ~59, ~280 and ~284 Hz. The remaining peaks in the figure are harmonics of these, many of which are aliased harmonics. Table 1 summarizes the actual frequencies of the fundamental vibrational modes and the harmonics and where the peaks for the fundamental vibrational modes and the aliased harmonics appear in the data.

TABLE 1

Fundamental and harmonic frequencies shown as the actual frequency and the frequency at which the aliased signal appears

| | Frequency | | | | | |
|---|---|---|---|---|---|---|
| Harmonic | Actual | Aliased Signal | Actual | Aliased Signal | Actual | Aliased Signal |
| Fundamental (1) | 55.8 | | 280.1 | | 284.4 | |
| 2 | | 111.6 | 560.2 | 463.8 | 568.8 | 455.2 |
| 3 | | 167.4 | 840.3 | 183.7 | 853.2 | 170.8 |
| 4 | | 223.2 | 1120.4 | 96.4 | 1137.6 | 113.6 |
| 5 | | 279 | 1400.5 | 376.5 | 1422 | 398 |
| 6 | | 334.8 | 1680.6 | 367.4 | 1706.4 | 341.6 |

For the frequency domain vibration data of FIG. 4, the evaluation of the frequency domain vibration data can take a trial and error approach to determine and distinguish the vibrational resonance frequencies, non-aliased harmonic frequencies and aliased harmonic frequencies in the frequency domain vibration data. First, considering the peaks at 280.2 Hz and 284.4 Hz, if these are fundamental frequencies, then second harmonics (non-aliased) would be evident at 560.4 Hz and 568.8 Hz, respectively. Furthermore, the aliasing frequency can be calculated from $f_a=|Nf_s-f_f|$. Thus, given the sampling frequency rate is 1024 Hz, the second harmonics (aliased) are evident at 463.8 Hz and 455.2 Hz, respectively. There is an additional clue to help in this case with a small gap between the 2 peaks, this is multiplied for the harmonics so spotting the fundamental is slightly easier. The additional 3rd, 4th, 5th, and 6th harmonics for the fundamental frequencies of 280.2 Hz and 284.4 Hz can be determined using similar analysis. The peak at 55.8 Hz can be considered a fundamental frequency, which corresponds to 2nd, 3rd, 4th, 5th and 6th harmonics, all non-aliased frequencies as noted in Table 1.

The frequency domain vibration data of FIG. 4 shows the maximum amplitudes from many hours of data where each FFT is taken over 5 seconds. The peaks in the individual FFTs over time can be evaluated as described herein. In this case, the peaks corresponding to the fundamental frequencies tend to be mutually exclusive.

Importantly, the evaluation of the frequency domain vibration data can actually identify peaks in the frequency data at frequencies above the sampling frequency. We also see that although the difference in the fundamental frequencies for 281 and 284 Hz is 3 Hz, for the harmonics, the separation scales, and is larger. So for a system where the frequency changes, the identification and tracking of the aliased harmonics can be used to detect a change in the fundamental frequency with a system with much less resolution than one just tracking the fundamental vibration frequency.

Figure 5:
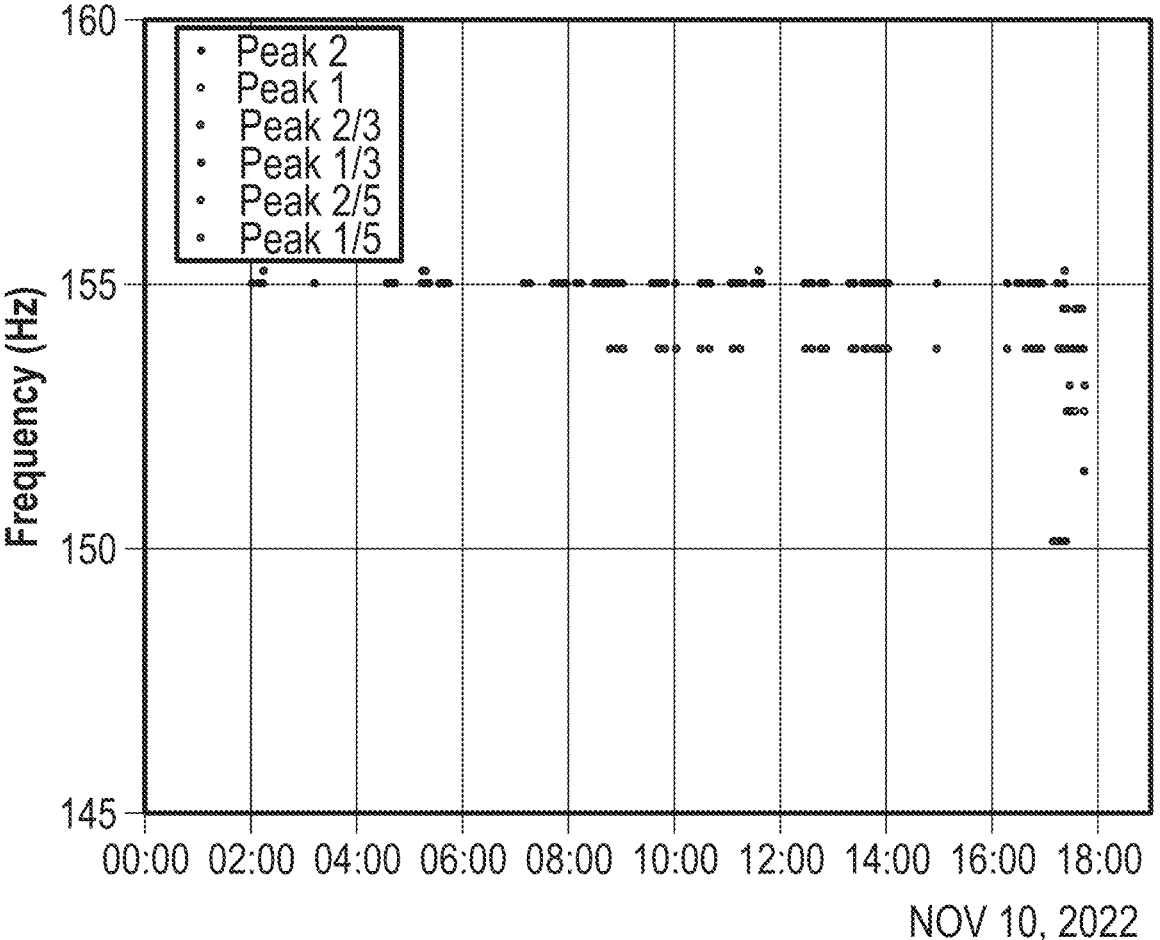
FIG. 5 is a plot illustrating the evaluation of fundamental vibration frequency of a drilling system over time which terminated with bit twist-off.

FIG. 5 shows the evaluation of fundamental vibration frequency of a drilling system over time which terminated with bit twist-off. The frequency domain vibration data is derived from a 3750 Hz signal with a 1024 point FFT to provide a resolution of 3.6 Hz. The processing is completed downhole and the peak amplitude and frequencies are saved for the highest 2 peaks every 2.7 seconds. The analysis identifies the fundamental vibration frequency of ~155 Hz. There is also a third harmonic normalized by 3 and a fifth harmonic normalized by 5. With the harmonics, the analysis can resolve a smaller change in the fundamental frequency, and in this run, which was terminated by a twist off, the analysis could have detected the change in frequency for detecting the twist-off failure with this approach.

The use of inversion of aliasing can be powerful but it will still require interpretation and the inversion will still carry some uncertainty. To mitigate this we consider taking a signal and digitizing it at two different frequencies, allowing aliasing on both.

Knowing that the aliased frequency can be written as:

$$f_a = |Nf_s - f_f|, \qquad \text{Eqn. (1)}$$

where N is zero or a positive integer and $0<f_a<f_s/2$

So considering the 284 Hz ($f_f$) plus harmonics system we sample at 1024 Hz and 786 Hz, $f_{s1}$ and $f_{s2}$. So the second harmonics will appear at aliased frequencies of $f_{s1}-2f_f$ and $f_{s2}-2f_f$, or 456 Hz and 200 Hz, respectively. The other harmonics are shown in Table 2. In the frequency domain everything below the Nyquist frequency will be unchanged but everything above this will be aliased to a different frequency. By comparing the new aliased frequencies, the non-aliased characteristics can be resolved.

TABLE 2

Actual frequencies of HFTO fundamental and harmonics together with the aliased frequencies for systems sampled at 1024 and 768 Hz

| | | Sampling Frequency | |
|---|---|---|---|
| | | 1024 | 768 |
| | | Nyquist Frequency | |
| | | 512 | 384 |
| Harmonic | Actual | Aliased as | |
| Fundamental (1) | 284 | | |
| 2 | 568 | 456 | 200 |
| 3 | 852 | 172 | 84 |
| 4 | 1136 | 112 | 368 |
| 5 | 1420 | 396 | 116 |
| 6 | 1704 | 344 | 168 |

As a worked example a synthetic vibration signal was generated with a fundamental vibrational resonance frequency of 250 Hz with 5 harmonic frequencies. The amplitude of the harmonics is shown in Table 3. This synthetic vibration signal was sampled at 50 kHz and converted to the frequency domain vibration data shown in FIG. 6A. This synthetic vibration signal was also sampled at 1.1 kHz and converted to the frequency domain vibration data shown in FIGS. 6B and 6D. This synthetic vibration signal was also sampled at 700 Hz and converted to the frequency domain vibration data shown in FIGS. 6C and 6E. The results are also summarized in Table 3. Note that the plot of FIG. 6D corresponds to the plot of FIG. 6B at an extended scale, and the plot of FIG. 6E corresponds to the plot of FIG. 6C at an extended scale.

TABLE 3

| Summary of peak frequencies in actual and aliased data | | | |
|---|---|---|---|
| | | Actual | |
| | | 1100 Hz | 700 Hz |
| | | Nyquist | |
| Harmonic | Amplitude | 550 Hz | 350 Hz |
| Fundamental (1) | 1 | 250 | 300 | 300 |
| 2 | 0.75 | 500 | 500 | 200 |
| 3 | 0.5 | 750 | 350 | 50 |
| 4 | 0.25 | 1000 | 100 | 300 |
| 5 | 0.15 | 1250 | 150 | 150 |
| 6 | 0.1 | 1500 | 400 | 100 |

It is evident that if presented with the 1100 Hz data an interpretation of the aliasing would be possible, but it would require the assumption that all of the spikes were from harmonics. However, if the data from the 1100 and 700 Hz sampling was available a unique inversion is viable.

Figures 6A, 6B, 6C, 6D, 6E:
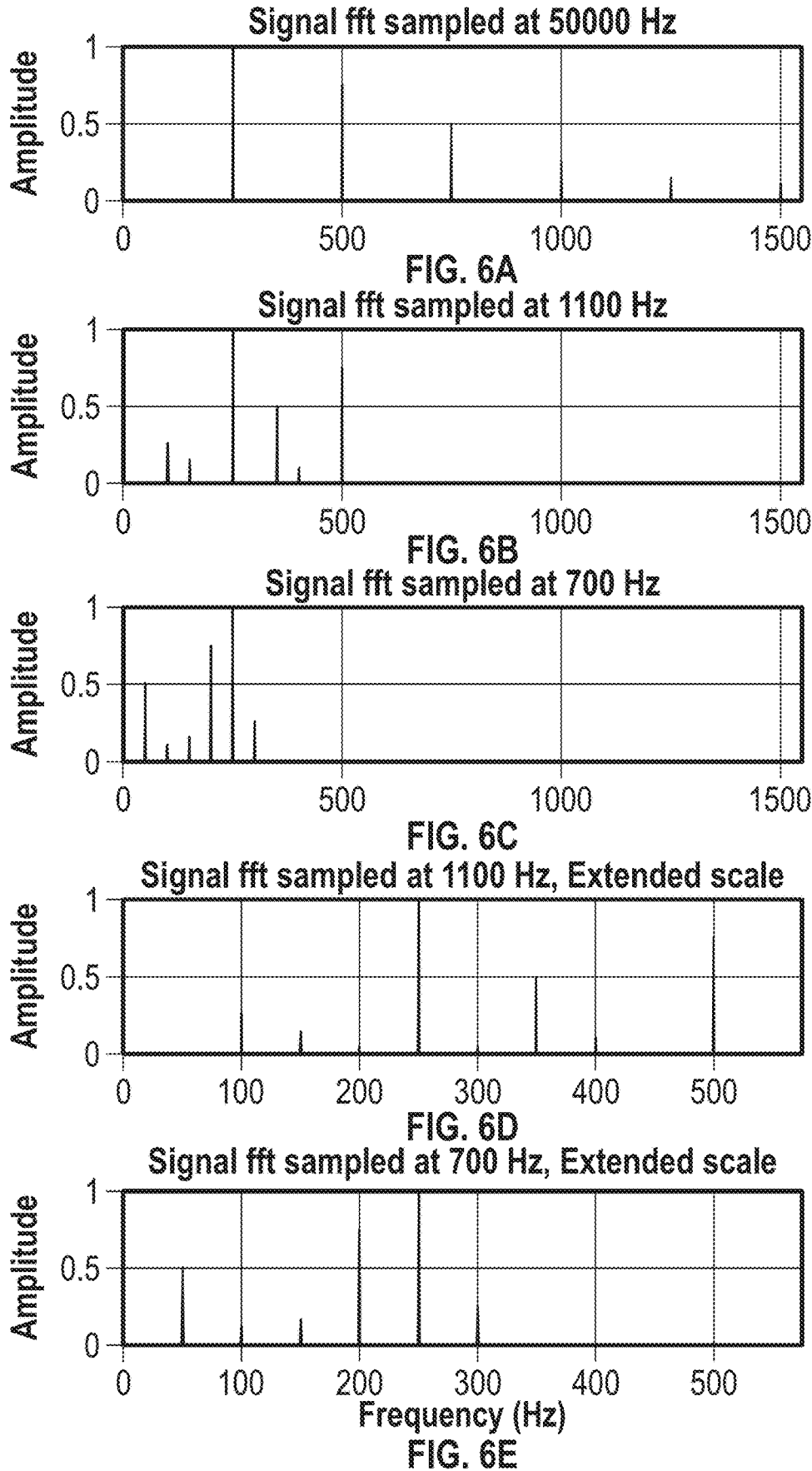
FIGS. 6A to 6E illustrate frequency domain vibration data converted from a synthetic vibration signal sampled at three different frequencies including 5 kHz, 1.1 kHz, and 700 Hz. The synthetic vibration signal has a fundamental vibrational resonance frequency of 250 Hz and 5 harmonic frequencies.
Figures 7A, 7B, 7C, 7D, 7E:
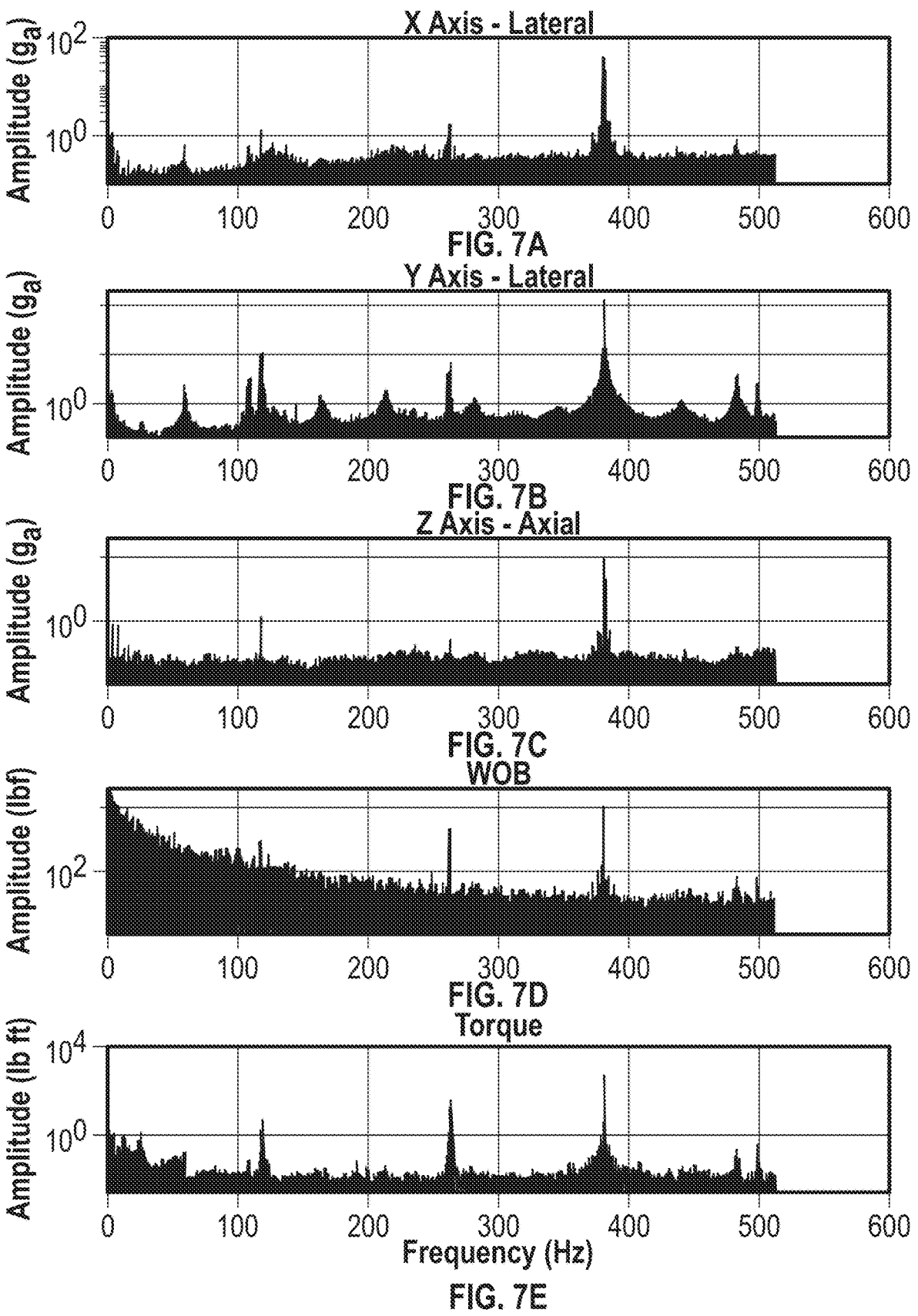
FIGS. 7A to 7E illustrate frequency domain vibration data converted from different measurements/parameters of a drilling system including X-axis (lateral) acceleration, Y-axis (lateral) acceleration, Z-axis (azimuthal) acceleration, weight-on bit measurements, and torque measurements.

For the frequency domain vibration data of FIGS. 6B and 6C, the frequency domain vibration data can be evaluated to determine and distinguish the vibrational resonance frequencies, non-aliased harmonic frequencies and aliased harmonic frequencies in the frequency domain vibration data. In embodiments, such evaluation can take a tabular approach. Specifically, if the same channel is sampled and the amplitude is preserved, then we know the peak at 350 Hz for the 1100 Hz sampling of FIG. 6B corresponds to the peak at 50 Hz for the 700 Hz sampling of FIG. 6C. Table 4 below tabulates values derived from eqn. (1) above to find peak harmonic frequencies that satisfy both sampling frequencies.

TABLE 4

| Sample Frequency 700 | | | | | | | |
|---|---|---|---|---|---|---|---|
| Measured | N | | | | | | |
| Frequency Peak | 0 | 1 | 1 | 2 | 2 | 3 | 3 |
| 50 | 50 | 650 | 750 | 1350 | 1450 | 2050 | 2150 |

| Sample Frequency 1100 | | | | | | | |
|---|---|---|---|---|---|---|---|
| Measured | N | | | | | | |
| Frequency Peak | 0 | 1 | 1 | 2 | 2 | 3 | 3 |
| 350 | 350 | 750 | 1450 | 1850 | 2550 | 2950 | 3650 |

From Table 4, one can see that the only possible solution is a harmonic frequency for the 1st-order harmonic at 750 Hz. Thus, the analysis can determine that the frequency peak at 50 Hz in FIG. 6B corresponds to the alias of the 2nd-order harmonic of the fundamental frequency of 350 Hz. If the sampling is configured to sample different coupled parameters as described below with respect to FIGS. 7A to 7E and the amplitudes are different, other peaks would be added to the table to find the solution.

The vibrational frequency analysis as described herein can bring considerable benefits by allowing interrogation of higher frequency events using lower frequency sampling but would require the same signal to be digitized twice. In the subject disclosure, a physical system is considered where different parameters are coupled. FIGS. 7A to 7E show data from a downhole tool that is configured to measure triaxial accelerations as well as Torque and Weight on Bit. In this case, the same fundamental frequency (384 Hz) and aliased harmonics appear in all of the data. Thus, the method as described herein can be applied where one or more of the triaxial acceleration measurements can be sampled at one sampling frequency and converted to frequency domain vibration data corresponding to the one or more of the triaxial acceleration measurements. Furthermore, one or more of the torque and weight-on-bit measurements can be sampled at another different sampling frequency and converted to frequency domain vibration data corresponding to the torque and/or weight-on-bit measurements. The frequency domain vibration data corresponding to both sets of measurements (i.e., the one or more of the triaxial acceleration measurements, and the torque and/or weight-on-bit measurements) can be evaluated to identify and track the aliased harmonics in the frequency domain vibration data over time, which can be used to evaluate a change in the fundamental frequency in the frequency domain vibration data over time and detect or predict the occurrence of a defect or failure or other unwanted conditions in the drilling system. This method can achieve the same result as interrogating the higher frequency events without sampling at very high frequencies.

Figure 8:
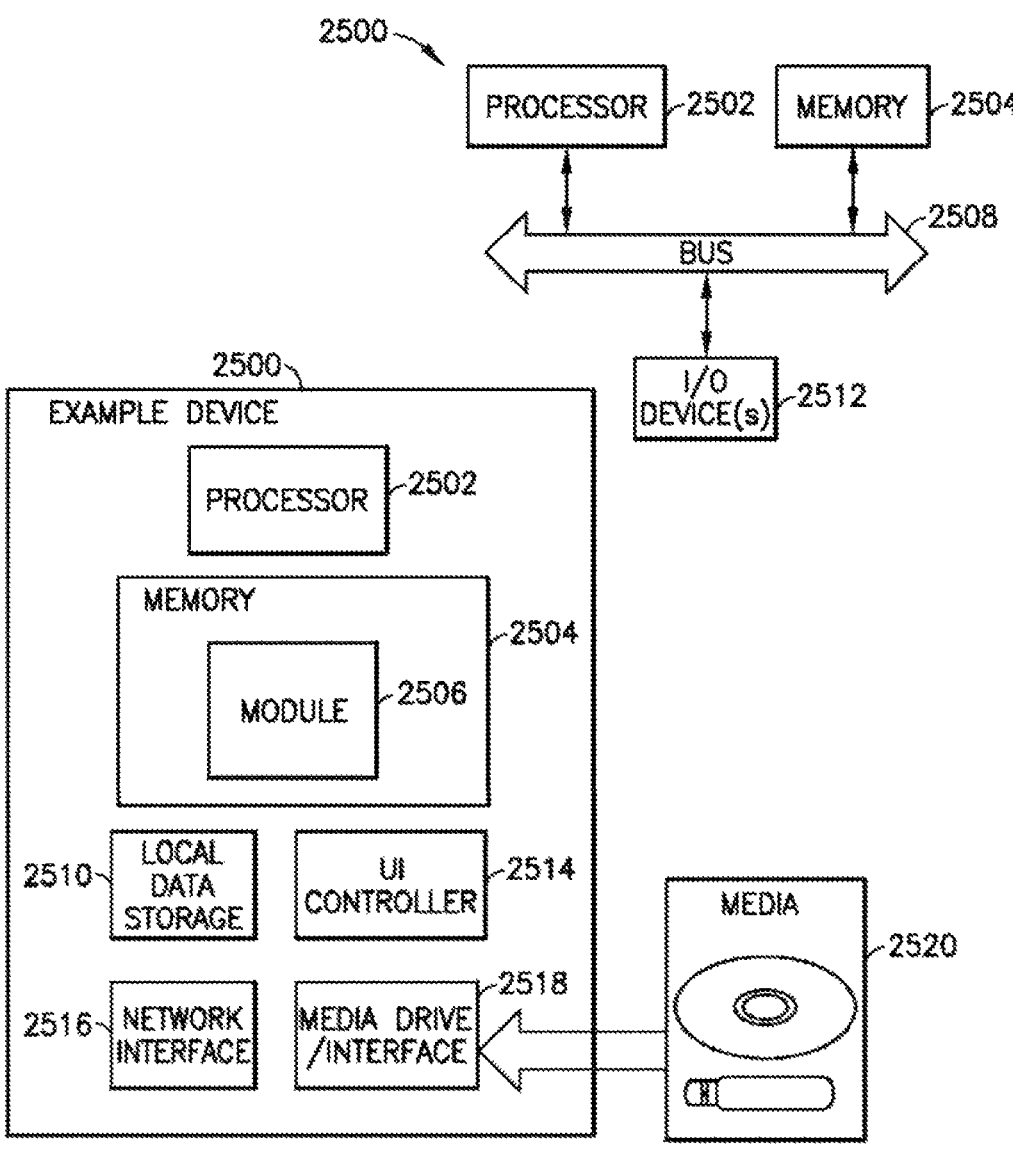
FIG. 8 is a schematic illustration of a computer processing system.

FIG. 8 illustrates an example device 2500, with a processor 2502 and memory 2504 that can be configured to implement various embodiments of the methods and processes as discussed in the present application. Memory 2504 can also host one or more databases and can include one or more forms of volatile data storage media such as random-access memory (RAM), and/or one or more forms of non-volatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable tangible media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Although only a few example embodiments have been described in detail above, those skilled in the art will readily appreciate that many modifications are possible in the example embodiments without materially departing from this invention.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for assessing health of a downhole drilling system, comprising:

obtaining or collecting time-series vibration data related to drilling operations of the drilling system, wherein the time-series vibration data is derived from data sampling operations of a plurality of different signals at a plurality of distinct sampling frequencies, the plurality of distinct sampling frequencies including a first sampling frequency and a second sampling frequency;

converting the time-series vibration data to frequency domain vibration data; and evaluating the frequency domain vibration data over time to identify and track at least one fundamental frequency, corresponding non-aliased harmonic frequencies in the frequency domain vibration data that are less than a Nyquist frequency associated with the first sampling frequency, and corresponding aliased harmonic frequencies in the frequency domain vibration data that are greater than the Nyquist frequency associated with the first sampling frequency.

2. The method of claim 1, further comprising:

monitoring change in the at least one fundamental frequency in the frequency domain vibration data over time; and detecting or predicting occurrence of a defect or failure or other unwanted condition in the downhole drilling system based on the monitoring.

3. The method of claim 2, further comprising:

selectively generating an alert in response to detecting or predicting occurrence of a defect or failure or other unwanted condition in the downhole drilling system.

4. The method of claim 1, wherein:
the time-series vibration data is measured by at least one downhole sensor integral to the drilling system.

5. The method of claim 1, wherein:
converting the time-series vibration data to frequency domain vibration data employs a Fast Fourier Transform.

6. The method of claim 1, further comprising:
evaluating the frequency domain vibration data over time to identify and track second corresponding non-aliased harmonic frequencies in the frequency domain vibration data that are less than a Nyquist frequency associated with the second sampling frequency and second corresponding aliased harmonic frequencies in the frequency domain vibration data that are greater than the Nyquist frequency associated with the second sampling frequency.

7. The method of claim 1, wherein:
the plurality of different signals represent at least one or more of X-axis acceleration, Y-axis acceleration, Z-axis acceleration, weight on bit, or torque on bit.

8. The method of claim 1, wherein:
the time-series vibration data is derived from data sampling operations of at least one signal representing X-axis acceleration, Y-axis acceleration, Z-axis acceleration, weight on bit, or torque on bit.

9. The method of claim 1, wherein at least part of the method is carried out by a downhole processor during the drilling operations.

10. One or more non-transitory computer-readable storage media including instructions that, when executed by one or more processors, cause the one or more processors to perform operations comprising:
obtaining or collecting time-series vibration data related to drilling operations of the drilling system, wherein the time-series vibration data is derived from data sampling operations of a plurality of different signals at a plurality of distinct sampling frequencies, the plurality of distinct sampling frequencies including a first sampling frequency and a second sampling frequency;
converting the time-series vibration data to frequency domain vibration data; and
evaluating the frequency domain vibration data over time to identify and track at least one fundamental frequency, corresponding non-aliased harmonic frequencies in the frequency domain vibration data that are less than a Nyquist frequency associated with the first sampling frequency, and corresponding aliased harmonic frequencies in the frequency domain vibration data that are greater than the Nyquist frequency associated with the first sampling frequency.

11. The one or more non-transitory computer-readable storage media of claim 10, wherein the instructions further cause the one or more processors to:
monitor change in the at least one fundamental frequency in the frequency domain vibration data over time; and
detect or predict occurrence of a defect or failure or other unwanted condition in the downhole drilling system based on the monitoring.

12. The one or more non-transitory computer-readable storage media of claim 11, wherein the instructions further cause the one or more processors to:
selectively generate an alert in response to detecting or predicting occurrence of a defect or failure or other unwanted condition in the downhole drilling system.

13. The one or more non-transitory computer-readable storage media of claim 10, wherein:
the time-series vibration data is measured by at least one downhole sensor integral to the drilling system.

14. The one or more non-transitory computer-readable storage media of claim 10, wherein:
the converting the time-series vibration data to frequency domain vibration data employs a Fast Fourier Transform.

15. The one or more non-transitory computer-readable storage media of claim 10, wherein the instructions further cause the one or more processors to:
evaluate the frequency domain vibration data over time to identify and track second corresponding non-aliased harmonic frequencies in the frequency domain vibration data that are less than a Nyquist frequency associated with the second sampling frequency and second corresponding aliased harmonic frequencies in the frequency domain vibration data that are greater than the Nyquist frequency associated with the second sampling frequency.

16. The one or more non-transitory computer-readable storage media of claim 10, wherein:
the plurality of different signals represent at least one or more of X-axis acceleration, Y-axis acceleration, Z-axis acceleration, weight on bit, or torque on bit.

17. The one or more non-transitory computer-readable storage media of claim 10, wherein:
the time-series vibration data is derived from data sampling operations of at least one signal representing X-axis acceleration, Y-axis acceleration, Z-axis acceleration, weight on bit, or torque on bit.

18. The one or more non-transitory computer-readable storage media of claim 10, wherein the one or more processors comprise a downhole processor operable during the drilling operations.

* * * * *